Nov. 24, 1964 S. E. LAGER 3,158,061
LOW TOXICITY ROCKET MOTOR
Filed Oct. 29, 1962

INVENTOR.
SAMUEL E. LAGER
BY Erwin F. Johnston
George J. Rubens
ATTORNEYS

3,158,061
LOW TOXICITY ROCKET MOTOR
Samuel E. Lager, La Cumbra Road, Box 385, Somis, Calif.
Filed Oct. 29, 1962, Ser. No. 233,981
3 Claims. (Cl. 89—1.7)
(Granted under Title 35, U.S. Code (1952), sec. 266)

The invention described herein may be manufactured and used by or for the Government of the United States of America for governmental purposes without the payment of any royalties thereon or therefor.

The present invention relates to low toxicity missiles or rocket motors and more particularly to a rocket motor for and method of minimizing toxicity to personnel in the vicinity of launch even though the motor contemplates the use of a highly toxic fuel.

The addition of certain additives to rocket fuels has been found to be very desirable because of the highly specific impulse that is obtained therefrom, however, many of these additives have been found to produce highly toxic gases. One such additive is beryllium which upon burning produces beryllium oxide causing suffocation by clogging of pores in the lungs, thus preventing oxygen from entering the blood and carbon dioxide from leaving the blood. Because of its high toxicity beryllium has been extremely hazardous to use when launching from either a shipboard site or a land site. This disadvantage has greatly reduced the operational capabilities of the rocket motor. The present invention has solved the problem of high toxicity by providing a rocket motor which upon initial firing burns a relatively non-toxic fuel until the missile is at a safe distance from the launching site and then the high impulse high toxicity fuel is ignited, thereby minimizing the hazard to personnel in the vicinity of the launching site.

An object of the present invention is to provide a rocket motor which has high impulse capabilities and yet upon launch minimizes toxic effects to personnel in the launching vicinity.

Another object is to provide an apparatus for and method of minimizing the toxic effects to personnel in the vicinity of launch even though the motor employs a highly toxic rocket fuel.

A further object is to provide a device for and method of exhausting highly toxic gases from a rocket motor until the motor is a safe distance from the launching site.

A still further object is to displace a rocket motor employing a highly toxic fuel from the vicinity of launch prior to ignition of said fuel.

Other objects and many of the attendant advantages of this invention will be readily appreciated as the same becomes better understood by reference to the following detailed description when considered in connection with the accompanying drawings wherein.

Figure 1:
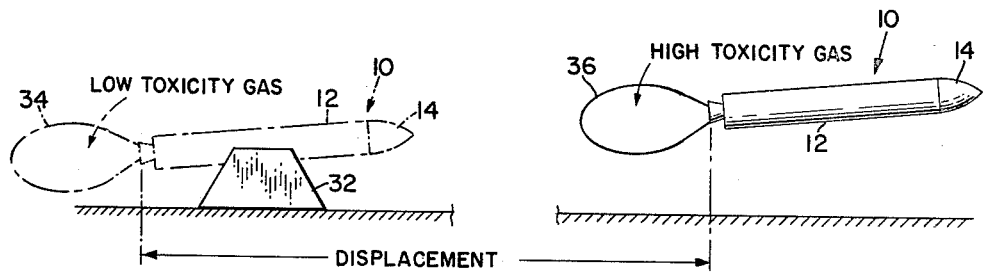
FIG. 1 shows a schematic view of a missile upon launch and a time thereafter.
Figure 2:
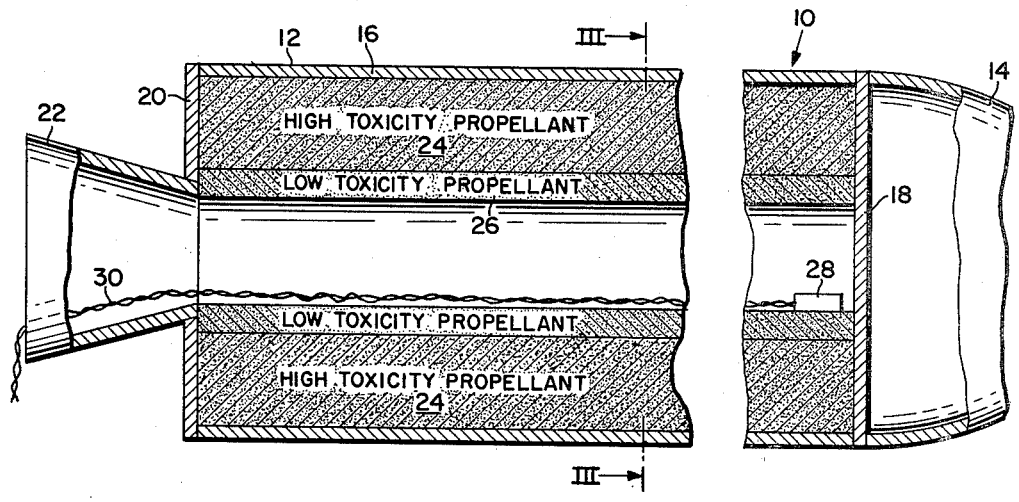
FIG. 2 shows a cross section of the missile through its rocket motor.
Figure 3:
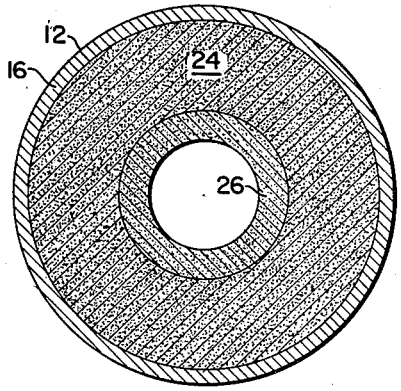
FIG. 3 shows a view taken along line III—III of FIG. 2.

Referring now to the drawings, wherein like reference numerals designate like or corresponding parts throughout the several views, there is shown in the figures a missile 10 having a rocket motor 12 and a nose 14. The rocket motor 12 has an outer skin 16 and is closed at a forward end by a forward wall 18 and is partially closed at an aft end by an after annular wall 20. Joined within the after wall 20 is an exhaust nozzle 22 for exhausting gases from the rocket motor 12.

Disposed within the rocket motor 12 is a high toxicity propellant 24 which is made highly toxic by an additive such as beryllium (fuel). Disposed within and immediately adjacent the high toxicity propellant 24 is a conventional low toxicity propellant 26 such as ammonium perchlorate with an aluminum base. The low toxicity propellant 26 is ignited prior to ignition of the high toxicity propellant 24 by an igniter 28 which is actuated by the application of an electrical current to an igniter lead 30. After the burning of the low toxicity propellant 26 the toxic propellant 24 is ignited by the heat of reaction of the low toxicity propellant due to their adjacent relationship.

In a preferred embodiment the amount of the charge of the low toxicity propellant 26 is to be such that prior to the ignition of the high toxicity propellant 24 the missile 10 is propelled a sufficient distance from the place of launch so that the gases from the high toxicity propellant 24 will be dispersed in the atmosphere to such an extent that there is substantially no hazard to personnel in the launching vicinity. Accordingly, the design of the amount of the charge of low toxicity propellant 26 depends upon many factors such as: wind velocity, direction of wind, temperature and quantity of highly toxic exhaust gases to be dispersed. After these factors are taken into consideration normally a safety factor will be introduced to insure that the high toxicity gases are dispersed sufficiently so as to present no substantial hazard. It is to be noted, however, that the use of any amount of the low toxicity propellant 26 prior to ignition of the high toxicity propellant 24 will minimize the hazards to personnel in the vicinity of launch. The design parameters may change depending upon the circumstances such as (1) a coastal launch toward the sea where coastal cities are close by, in which case the safety factor may have to be increased, (2) launching from a ship where the relative wind can be controlled to some extent by the movement and direction of the ship and (3) where there is a possibility that the harmful dust from the high toxicity gases may accumulate in still air conditions only to be picked up collectively later on by wind conditions, thus increasing the toxic concentration.

The operation of the invention is shown in FIG. 1 wherein the missile 10 is launched from a land located launching platform 32 by applying a current to the igniter lead 30. This causes the igniter 28 to ignite the low toxicity propellant 26 which initially exhausts through the nozzle 22 forming the plume 34 of low toxicity gases. The low toxicity propellant 26 burns until the missile 10 has been displaced a sufficient distance from the launching platform 32 after which the high toxicity propellant 24 is ignited by the heat of the low toxicity propellant 26. The displacement is such that a plume 36 of high toxicity gases, caused by the burning of the high toxicity propellant 24 will be dispersed to such an extent that there is no substantial hazard to personnel in the launching vicinity.

The embodiment described will lend itself to easy construction. First, a cylindrical mandrel having a diameter equal to the desired inside diameter of the high toxicity propellant 24 is aligned axially with the outer skin 16, after which the toxic propellant 24 is poured about the mandrel and allowed to cure. This mandrel is then removed and a smaller cylindrical mandrel having a diameter equal to the intended size of the inside diameter of the low toxicity propellant 26 is axially aligned within the motor 12 and the low toxicity propellant 26 is poured about this mandrel and allowed to cure. The smaller mandrel is then removed and the propellants are ready for operation upon completion of the missile.

While the propellants 24 and 26 have been shown as cylindrical grains it is to be understood that they may take many various shapes such as star shape, cruciform or roseate or they could even be end burning grains with the high toxicity propellant being located forward of the low toxicity propellant so that the latter will be first to burn. Further, the missile may have several stages in which case the first stage could employ the invention or the first stage itself could be constructed entirely with the low toxicity propellant with subsequent stages having the high toxicity propellant. Also, while the high toxicity propellant 24 has been described as being ignited by the heat of the burning of the low toxicity propellant 26 it is to be understood that a separate igniter could be employed to perform this function. In addition the invention may be practiced with all types of vehicles which discharge a high toxicity gas by first displacing the vehicle from personnel prior to discharging this gas.

It is to be understood that all rocket propellants are capable of producing toxic gases and that toxicity is a matter of degree. For the purpose of this specification "high toxicity propellant" is to refer to a propellant which under the circumstances of a given wind, quantity of gases to be dispersed, etc. will produce a gas which will incapacitate personnel in a designated vicinity such as the launching vicinity when such propellant is initially fired from the place of launch and burned thereafter. Accordingly, "low toxicity propellant" refers to a propellant which under the circumstances will not incapacitate personnel in a designated area when fired from the place of launch and burned thereafter. Generally speaking, additives such as beryllium, fluorine or lithium to ordinary rocket propellants such as ammonium perchlorate will under most circumstances normally make the propellant fall in the "high toxicity" category whereas additives such as aluminum, magnesium or boron to the ordinary rocket propellants will under most circumstances normally make the propellant fall within the "low toxicity" category.

It is now readily apparent that the present invention now makes it possible to employ a rocket motor which exhausts high toxicity gases without any substantial hazard to personnel in the launching area by initially displacing the rocket motor a sufficient distance from the launching area prior to exhausting such gases.

Obviously many modifications and variations of the present invention are possible in the light of the above teachings. It is therefore to be understood, that within the scope of the appended claims, the invention may be practiced otherwise than as specifically described.

I claim:
1. A missile rocket motor which operates on rocket fuel and disperses a minimum of toxic gases at and for a predetermined period after launch comprising:
   a combustion chamber in said rocket motor;
   a rocket propellant of high toxicity formed in the outer portion of said combustion chamber;
   a rocket propellant of low toxicity formed over said propellant of high toxicity intermediate said propellant of said high toxicity and the center portion of the combustion chamber;
   said combustion chamber being closed at its forward end and having a nozzle at its after end; and
   igniting means positioned along the inner surface of said propellant of low toxicity so that from the time of ignition of said igniting means to the end of a selected period of time thereafter exhaust gases emanating from said combustion chamber will have substantially no toxic effect on personnel in the vicinity of the launch site.

2. A rocket motor for a missile which operates on rocket fuel and during the launching stage has substantially no toxic effect on personnel within the vicinity of the launch site comprising:
   a combustion chamber opening through a nozzle;
   said chamber containing a high toxicity rocket propellant;
   said chamber further containing a low toxicity rocket propellant;
   said low toxicity rocket propellant being disposed with respect to the high toxicity rocket propellant so that the low toxicity rocket propellant is capable of burning independently of the high toxicity rocket propellant;
   means for initially igniting the low toxicity rocket propellant;
   said low toxicity rocket propellant upon ignition burning for a period of time sufficient to propel said missile a distance from the vicinity of launch to a location where exhaust of said high toxicity rocket propellant will have substantially no toxic effects on personnel within the vicinity of launch;
   means for igniting the high toxicity rocket propellant immediately upon the end of said period of time; and
   said high toxicity rocket propellant upon ignition burning only after said period of time.

3. A rocket motor for a missile which operates on rocket fuel and during the launching stage has substantially no toxic effects on personnel within the vicinity of the launch site comprising:
   a firing chamber closed at a forward end and opening rearwardly through a nozzle;
   said chamber containing a high toxicity rocket propellant;
   said chamber further containing a low toxicity rocket propellant;
   said low toxicity rocket propellant being disposed with respect to the high toxicity rocket propellant so that the low toxicity rocket propellant is capable of burning independently of the high toxicity rocket propellant;
   said propellants being immediately adjacent one another so that as the low toxicity propellant completes its burning the heat therefrom will directly ignite the high toxicity propellant;
   means for initially igniting the low toxicity propellant;
   said low toxicity propellant upon ignition burning for a period of time sufficient to propel said missile a distance from the vicinity of launch to a location where exhaust of said high toxicity propellant will have substantially no toxic effects on personnel within the vicinity of launch;
   said high toxicity propellant upon ignition burning only after said period of time; and
   said high toxicity propellant being made toxic by a beryllium additive.

References Cited in the file of this patent
UNITED STATES PATENTS

| | | |
|---|---|---|
| 2,724,237 | Hickman | Nov. 22, 1955 |
| 2,926,613 | Fox | Mar. 1, 1960 |
| 2,956,401 | Kane | Oct. 18, 1960 |
| 3,031,969 | Collard et al. | May 1, 1962 |